Nov. 10, 1959     I. B. THIERMAN     2,911,832
GYROSCOPE
Filed Feb. 3, 1959     3 Sheets-Sheet 1

INVENTOR
Irwin B. Thierman.

BY

AGENT

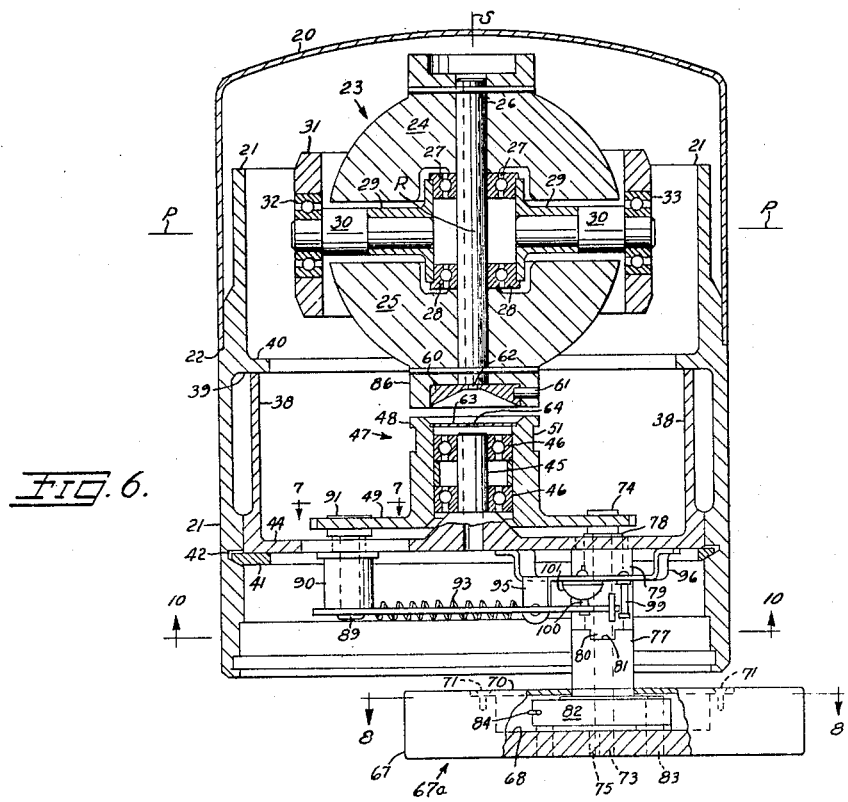

Nov. 10, 1959  I. B. THIERMAN  2,911,832
GYROSCOPE
Filed Feb. 3, 1959  3 Sheets-Sheet 3
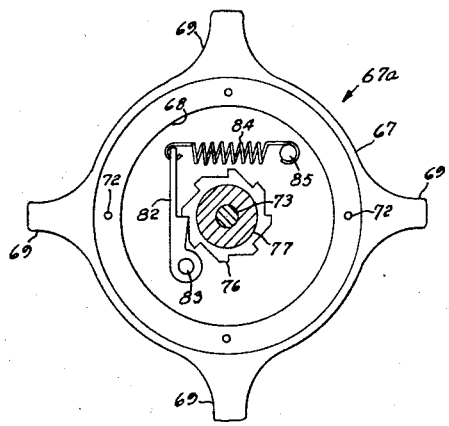
FIG. 8.
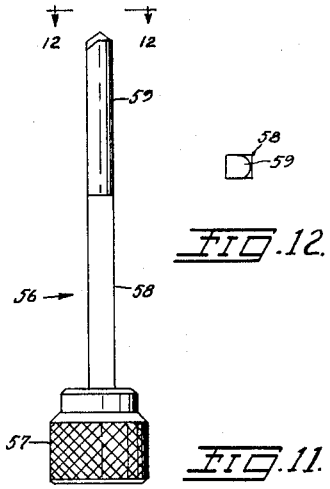
FIG. 12.
FIG. 11.
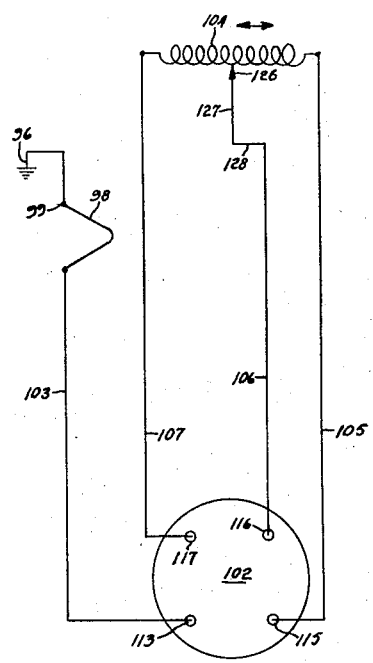
FIG. 13.
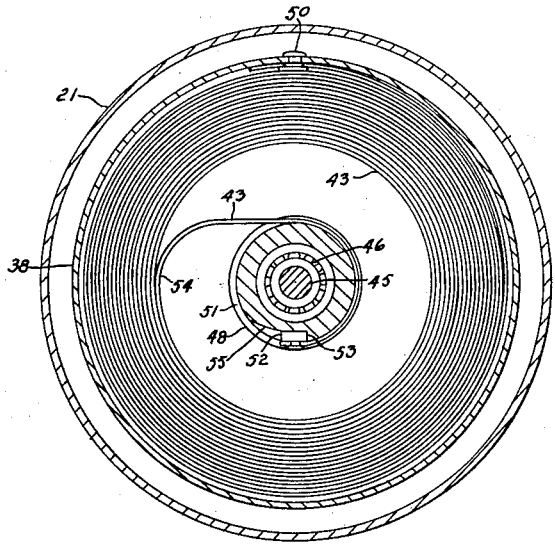
FIG. 9.
INVENTOR
Irwin B. Thierman.
BY
AGENT United States Patent Office 2,911,832
Patented Nov. 10, 1959

2,911,832
GYROSCOPE

Irwin B. Thierman, Portland, Oreg., assignor to Iron Fireman Manufacturing Company, a corporation of Oregon Application February 3, 1959, Serial No. 790,833

12 Claims. (Cl. 74—5.7)

This invention relates generally to gyroscopes and more particularly to a stored energy, single operation, device.

A principal object of this invention is to provide a gyroscope with means closely associated therewith for storing for an indefinite period the energy required to spin the gyroscope wheel for a required period together with means for beginning said spinning period at a particular instant.

It is a second object to provide such a gyroscope which is "free" of outside forces other than the friction of its moving parts during the required period of its operation.

It is a third object to provide such a gyroscope with means for indicating throughout the required period of its operation the angular position of the frame of the gyroscope about one of the gyroscope axes relative to an initial position of the frame about the axis.

It is a fourth object to provide such a gyroscope with means for restoring thereto the energy required for a new period of operation.

It is a fifth object to provide such a gyroscope which is simple to construct and operate as well as low in first cost and maintenance cost.

It is a sixth object to provide such a gyroscope in which the means for storing energy comprises a mass of resilient material.

Other objects comprise the provision of the unique parts and sub-assemblies here assembled.

How these and other objects are attained is made clear in the following specification referring to the attached drawings in which, Fig. 1 is a top plan view of one form in which this invention may be practiced. Part of the top cover is seen to be broken away to show other parts in plan.

Fig. 6 is a vertical sectional view along the center plane 6—6 of Fig. 1.

Fig. 7 is an enlarged fragmental plan view from the line 7—7 of Fig. 6.

Fig. 8 is a plan view in partial section along the line 8—8 of Fig. 6.

Fig. 9 is a sectional plan view along the line 9—9 of Fig. 2.

Fig. 10 is a bottom plan viewed upwardly from line 10—10 of Fig. 6.

Fig. 11 is a side view of an alignment pin used in aligning the gyro power supply with its spin axis preparatory to storing power in the power supply.

Fig. 12 is an end view of the pin of Fig. 11.

Fig. 13 is an internal wiring diagram of the device here disclosed.

Figure 1:
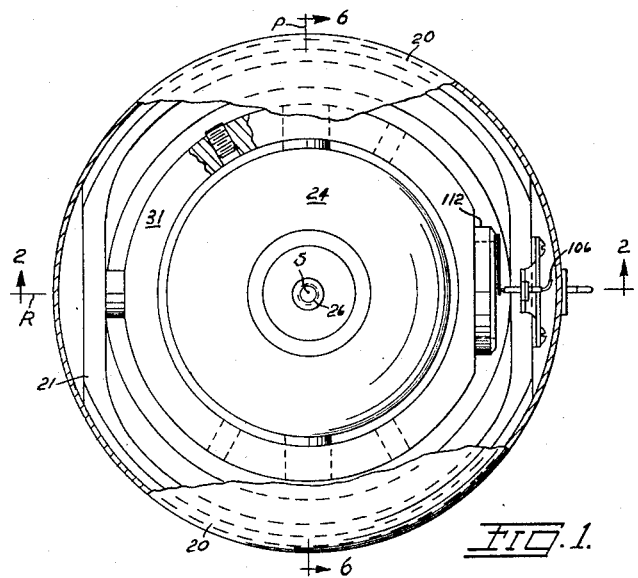
Figure 4:
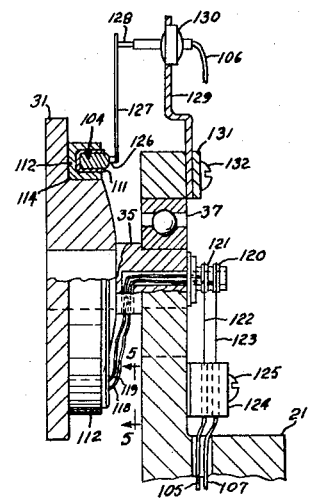
Fig. 4 is a fragmental sectional view along the line 4—4 of Fig. 3.

For drawing clarity parts are omitted from some of the figures if they are adequately shown in others of the figures.

Like reference numerals refer to like parts in the several figures of the drawing.

Referring now to the drawings, cover 20 is seen to cover the upper end of frame 21 and to be hermetically fitted thereto at annular step 22 formed therearound.

The gyroscope rotor 23 includes an upper half 24 and a lower half 25 both secured to an internally threaded shaft 26 rotatably carried on inner gimbal ring 29 by ball bearings 27, 28 as shown in Fig. 6. Diametrically inserted into holes formed therefor in inner gimbal ring 29 and secured therein are inner gimbal ring journals 30 the outer ends of which are diametrically carried in outer gimbal ring 31 by ball bearings 32, 33 as shown.

Figure 2:
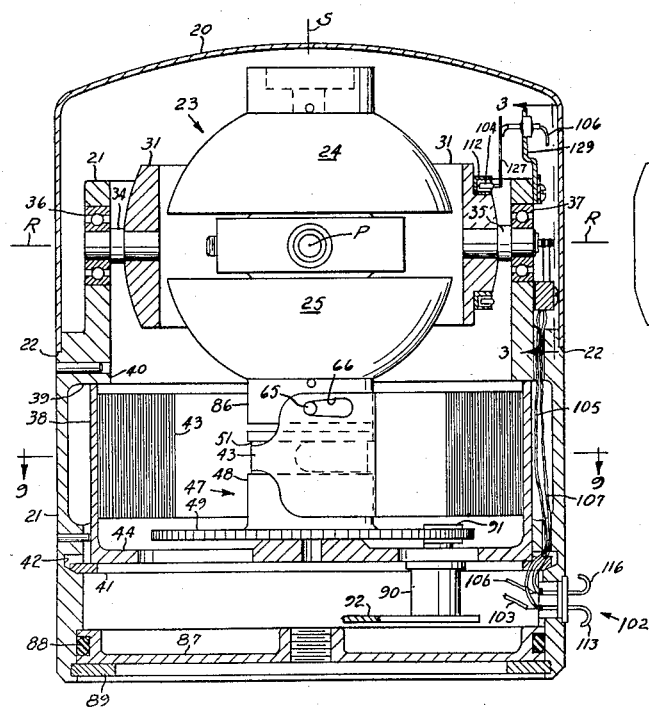
Fig. 2 is a view in side elevation and partial section along the line 2—2 of Fig. 1.
Figure 3:
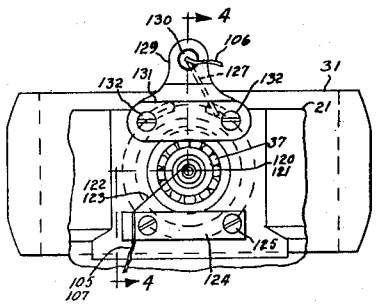
Fig. 3 is a fragmental view in side elevation along the line 3—3 of Fig. 2.
Figure 5:
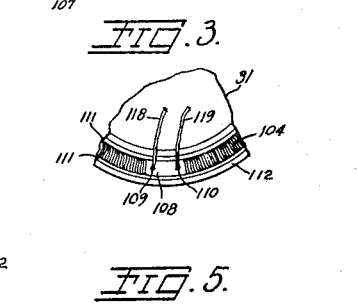
Fig. 5 is a fragmental elevation viewed from the line 5—5 of Fig. 4.

Fig. 2 shows how outer gimbal ring journals 34 and 35 are pressed diametrically into outer gimbal 31 to support outer gimbal ring 31 on frame 21 through ball bearings 36 and 37.

For purposes of discussion the axis of rotor 23 or shaft 26 will be called the S axis of the gyro, the axis of the inner gimbal ring journals 30 will be called the P axis and the axis of the outer gimbal ring journals 34, 35 will be called the R axis. It is understood that when the S, P and R axes are mutually perpendicular the gyro is in its caged position.

Spring housing 38 is pressed upwardly within frame 21 to abut the lower surface 39 of inwardly projecting annular extension 40 of frame 21 and is held securely in place by snap ring 41 outwardly expanding into annular groove 42 sunk outwardly into the wall of frame 21 as shown in Figs. 2 and 6. As seen in Fig. 9 clock type energy storage spring 43 is contained in spring housing 38.

Formed upwardly on the bottom 44 of housing 38 is axially hollow journal post 45 for bearing 46 rotatably supporting power drum 47 formed with a spool 48 for receiving spring 43 windably thereon and a gear 49 for winding spring 43 on spool 48. As seen in Figs. 2 and 9 the outer end of spring 43 is perforated to latch over the head of stud 50 secured as shown to the cylindrical side of spring housing 38 while the inner end of spring 43 is narrowed in width to lay for about one revolution of drum 47 into a groove 51 formed around spool 48. Latch button 52 is riveted to the narrow inner end of spring 43 to hook against latch surface 53, formed in groove 51 of spool 48, when spring 43 is being wound or is unwinding. However it should be noted particularly that spring 43 is formed to maintain when relaxed the shape it is shown in Fig. 9 to have between its inner end and the numeral 54. Thus if spool 48 as shown in Fig. 9 is running counterclockwise while spring 43 is unwound and stationary, button 52 will ride up ramp 55 formed in groove 51 of spool 48 and spool 48 will run without interference from spring 43.

The purpose of this gyro is to signal the angular position of frame 21 about the R axis for a required few minutes of time after the rotor has been brought up to speed about the S axis by spring 43 and released for free gyroscopic operation. During this operation the gyro rotor maintains its S axis direction in space and any relative movement of the frame 21 about the R axis will be signaled as required by means later to be described.

To prepare the gyro for its function, rotor 23 must be attached to the inner end of spring 43 and spring 43 must be wound to store energy therein and the combination must be latched in such a way that at the desired time the spring will quickly unwind to spin and release the rotor.

In Figs. 11 and 12 is shown an alignment key 56 having a knurled head 57 and a square shank 58 with a half rounded and somewhat pointed end section 59 formed on shank 59. Rotor key plate 60 pressed upwardly into hub 86 of lower half 25 of rotor 23 and held properly oriented therein by pin 61, as shown in Fig. 6, has a central hole 62 therethrough shaped to mate with the end part 59 of key 56.

Also power drum key plate 63 pressed downwardly into the upper end of spool 48 of power drum 47 has a central hole 64 therethrough formed to mate with the end part 59 of key 56. When key 56 has its end 59 moved upwardly through the central hole in journal 45 of drum 47 it will strike plate 63 and manual movement of the key will cause it to mate with and pass through hole 64. Further upward movement of key 56 will cause its end to strike the conical under surface of plate 60 to move hole 62 into alignment with key 56 so that manual movement of key 56 will cause its end 59 to pass through hole 62. Key 56 is thus used to hold rotor 23 into alignment and proper rotational relation with spool 48 of power drum 47 while the winding of spring 43 onto both rotor 23 and drum 47 is started. At this time (see Fig. 9) the clockwise rotation spool 48 will cause spool surface 53 to engage spring latch button 52 to start winding the narrow end of spring 43 onto spool 48 and then also to engage pin 65 (see Fig. 2) of rotor 23 with slot 66 formed through spring 43.

Once started the winding of spring 43 is continued by the winding, latching and releasing mechanism shown in Figs. 2, 6, 7, 8 and 10 as follows. In Figs. 6 and 8 winding handle assembly 67a is seen to include a winding handle 67 with a depression 68 sunk therein from the under side and four finger lugs 69 radiating from the outer rim thereof. A cover plate 70 is secured over depression 68 by screws 71 set into holes 72 of handle 67.

Shaft 73 of pinion 74 is staked by screw pin 75 into handle 67. Pinion 74 is shown in Fig. 6 in winding engagement with gear 49 of winding drum 47. Ratchet gear 76 with its one piece hub 77 with a reduced diameter extension 78 is seen to be rotatably secured on shaft 73 of pinion 74 with the hub 77 of ratchet gear 76 extending rotatably through a mating hole in cover 70.

Guiding bushing 79 for hub extension 78 of ratchet gear 76 is now rotatably secured at its upper end into a hole provided therefor in bottom plate 44 of spring housing 38. The lower end of bushing 79, Fig. 6, is seen to be formed with diametrically opposed downwardly depending lugs 80 adapted to engage as shown in Fig. 6 with upwardly open slots 81 formed on hub 77 of ratchet gear 76. Ratchet 82 pivoted on pin 83 is yieldingly positioned against ratchet gear 76 by spring 84 strained between pin 85 and the free end of ratchet 82.

It is seen in Fig. 6 that winding handle assembly 67a includes handle 67, cover plate 70, pinion 74 with shaft 73 secured by pin 75 to handle 67, ratchet gear 76 with hub 77 and hub extension 78, ratchet 82 and spring 84 and the assembly is operatively engageable as a unit with winding gear 49 by inserting pinion 74 and hub extension 78 upwardly through bushing 79 until pinion 74 engages gear 49 and slots 81 of ratchet hub 77 engage lugs 80 of bushing 79 fixed to bottom 44 of spring housing 38. With this arrangement the mating of lugs 80 with slots 81 prevents ratchet 76 from turning with respect to housing 38 and by turning handle 67 counterclockwise, as seen in Fig. 8, ratchet 82 will advance around stationary ratchet wheel 76 while shaft 73 turns pinion 74 to turn gear 49 clockwise, as seen in Fig. 9, to wind spring 43 on spool 48 of power drum 47. And as long as winding assembly 67a is in winding position ratchet 82 will engage ratchet wheel 76 to prevent the unwinding of the spring.

However when, by the use of winding assembly 67a, spring 43 has been wound to its limit on spool 48 and hub 86 of lower half 25 of rotor 23, means must be provided to latch gear 49 in its wound position and to unlatch gear 49 to allow spring 43 to spin rotor 23 when required. When gear 49 is latched as required winding assembly 67a is removed from its position as shown in Fig. 6 and lower sealing cover 87 with its O ring seal 88 is inserted into the bottom end of frame 21 where it is retained by snap ring 89 as shown in Fig. 2.

The means for latching gear wheel 49 in the stored energy position of spring 43 and for instantaneously unlatching wheel 49 to initiate the transfer of the potential energy of the spring to the kinetic energy of the rotor is shown in Figs. 2, 6, 7 and 10 as follows.

Axle 89 journaled in bushing 90 secured into bottom 44 of spring housing 38, has toothed latch 91 fixed thereto at its upper end and latch arm 92 fixed thereto at its lower end, as shown. Latch release spring 93 is strained between ear 94 of arm 92 and ear 95 of bracket 96, as shown. When power spring 43 is wound up by handle mechanism 67a as above described, toothed latch arm 92 is turned against the bias of spring 93 to its position shown in Fig. 10 and arm 92 moves toothed latch 91 with it to its position shown in Fig. 7. Arm 92 is held in its latched position by insulating nylon link 97 perforated with a rectangular hole through which the end of arm 92 is extended and a smaller round hole threaded by fuse wire 98 one end of which is secured to ground terminal pin 99 grounded to bracket 96. The other end of fuse wire 98 is secured, as shown, to one end of electric terminal 100 supported on bracket 96 by insulator 101. See also the internal wiring diagram of Fig. 13. When spring 43 is thus held in its wound position by gear 49 and latch 91, winding handle assembly 67a is removed.

Positioned as shown in Fig. 2 and shown schematically in Fig. 13 is a four terminal electric plug 102 which is connected through a control cable (not shown) to control circuits including power supplies outside the case 21. An internal wire 103 (Figs. 2 and 13), connects the other end of terminal 100 to terminal 113 of plug 102 so that when it is desired to spin the gyro rotor 23, a sufficient electric current from outside is sent to ground terminal 99 through terminal 113, wire 103 and fuse 98 to melt fuse 98 and release arm 92 to allow spring 93 to move arm 92 and latch 91 out of latching engagement with winding gear 49.

The presently indicated purpose of the gyro is to provide means for indicating and with other means controlling the angular position about the R axis of the gyro frame 21 with respect to an initial position thereof. The indicating means, shown in Figs. 1 to 5 and 13, is as follows. A potentiometer resistance wire 104 is a flexible strip of insulating board 108 having terminals 109, 110 secured thereon. Coil 104 on board 108 is then bent into toroidal shape and bedded into U sectional insulating ring 111 set into an annular groove formed into ring 112 pressed onto annular step 114 formed on outer gimbal ring 31. Wires 118, 119, supported in outer gimbal ring journal 35 as shown, connect potentiometer end terminals 109 and 110 respectively with slip rings 120, 121 insulatedly supported on journal 35. Slip ring brushes 122, 123 with their one end respectively connected to wires 105, 107 and insulatedly supported on frame 21 by insulator 124 and screws 125 have their other ends respectively pressed resiliently against slip rings 121, 120.

Potentiometer contact 126 secured to the free end of resilient blade 127 secured to terminal rod 128 connected to wire 106 is insulatedly anchored on bracket 129 by insulator 130. Bracket 129 is positioned adjustably about the R axis on frame 21 by keeper plate 131 and screws 132. When an electric current from an outside source is passed through terminals 115, 117, wires 105, 107, brushes 122, 123, slip rings 121, 120, wires 119, 118 and potentiometer winding 104 the voltage across the end terminals 115, 117 will be divided by slider contact 126 in accordance with the angular position of frame 21 about the R axis with respect to a preset midpoint for contact 126 in winding 104. The use of the potentiometer for its intended purpose here is old in the art, but the secure setting of the potentiometer 104 in its supporting ring 112 on outer gimbal ring 31 is believed to be new and a great improvement over prior art means.

Having first recited some of the objects of this invention the novel and useful methods and means for attaining these and other objects are seen to include: a novel and useful rotor and gimbal ring structure affording an unusually large gyrostatic stiffness for its size; a novel and useful spring and arrangement thereof for storing several minutes demand of driving energy for the gyro rotor; novel and useful means for aligning the gyro rotor with the spring axis and winding the spring into driving association with the rotor; novel and useful means for latching the spring in driving relation with the rotor; novel and useful means for unlatching the spring instantaneously to begin and rapidly to complete the transfer of the potential energy of the spring to kinetic energy of the gyro; novel and useful means for releasing the spring from contact or interference with the rotor while leaving the spring in position and condition for rapid connection to and rewinding on the rotor; novel and useful means for providing simultaneously with relative movement of the outer gimbal ring and the frame of the gyro means for usefully indicating such relative movement; novel and useful parts structures and sub combinations thereof; together with a complete description of parts, their functions, arrangements and operation together, I claim:

1. A gyroscope including a frame, an outer gimbal ring including a pair of outer gimbal ring journals diametrically extending therefrom rotatably to support said outer gimbal ring on a pair of outer gimbal ring bearings supported on said frame, an inner gimbal ring including a pair of inner gimbal ring journals diametrically extending therefrom rotatably to support said inner gimbal ring on a pair of inner gimbal ring bearings supported on said outer gimbal ring, said inner gimbal ring bearings being axially perpendicular to said outer gimbal ring bearings, said inner gimbal ring being formed with a generally cylindrical hole therethrough, a pair of rotor bearings supported axially perpendicularly to said inner ring bearings in said hole in said inner ring symmetrically spaced on opposite sides of the axis of said inner ring bearings, a rotor shaft extending axially through both said rotor bearings and secured thereon and a rotor including said rotor shaft and upper and lower rotor halves secured along said rotor shaft respectively on the ends of said shaft outside said rotor bearings.

2. The gyroscope of claim 1 in which one of said rotor halves includes a cylindrical hub extending therefrom axially of said rotor shaft.

3. The gyroscope of claim 2 in which said cylindrical hub includes means forming a first axial hole in said hub, said hole having a non-circular perimeter in transverse section.

4. The gyroscope of claim 3 in which said frame includes: a transverse barrier secured thereacross; said barrier including an axially hollow journal post extending from one side thereof toward said rotor in axial alignment with said rotor shaft when said rotor shaft said outer gimbal ring bearings and said inner gimbal ring bearings are mutually axially perpendicular; a power drum rotatably supported on said journal post coaxially therewith; said power drum including means forming a second axial hole therethrough like said first axial hole in said hub of said rotor whereby said rotor is movable in said frame about said rotor bearings and with said gimbal rings to register said two axial holes both axially and rotatably of said rotor axis.

5. The gyroscope of claim 4 including a key rod formed with a rotation controlling handle at one end a cross section along the other end of a form non-rotatably to mate with said first and second axial holes in said rotor hub and said power drum, whereby the end of said key rod is axially insertable through said second axial hole in said power drum axially to urge said rotor into alignment with said drum and rotatably to register said axial holes to axially insert said rod through said first axial hole to fix said rotor and said drum in axial and preset angular alignment until said key rod is withdrawn from said holes to free said rotor from said drum.

6. The gyroscope of claim 5 including a clock type spring supported in said frame coaxially with said power drum, means securing the outer end of said spring to said frame and overrunning clutch means for securing the inner end of said spring to said drum whereby after said drum is rotated to wind said spring and when said drum is released to be rotated by the unwinding of said spring said drum will be clutched to said spring until said drum exceeds the velocity of the inner end of the unwinding spring.

7. The gyroscope of claim 6 including latch means cooperatively formed on said rotor and said spring for securing said rotor coaxially to said spring to rotate with said drum as said spring is wound and unwound from said drum and to unlatch said rotor for rotation free of said spring and said drum before said drum is released from said spring by said overrunning clutch.

8. The gyroscope of claim 4 including gear means formed coaxially on said power drum and pinion means for driving said gear means removably journalled in said frame axially parallel with said power drum, said pinion means including manually operable ratchet means for driving said gear in one direction of rotation.

9. The gyroscope of claim 8 including a lever means pivoted on said frame for latching said gear against the rotation of said spring in its unwinding direction, said lever means including biasing means for biasing said lever means for rotation in a direction to unlatch said gear and means holding said lever against the bias of said biasing means.

10. The gyroscope of claim 9 including means for releasing said lever from said means holding said lever against the bias of said biasing means, said means for holding said lever including an electric fuse wire and said means for releasing said lever including means for applying an electrical voltage to the ends of said fuse wire to fuse said wire with an electric current.

11. A gyroscope including a frame, an outer gimbal ring journalled on said frame on an outer ring axis, an inner gimbal ring journalled on said outer gimbal ring on an inner ring axis normal to said outer ring axis, a rotor journalled on said inner gimbal ring on a rotor shaft having an axis normal to said inner ring axis, said gyroscope being in an erect position when said three axes are mutually normal one to the other, a spring secured at its outer end to said frame, winding means removably engageable to said spring at its inner end for winding said spring about an axis coaxial with the erected position of said rotor axis, means releasably latching said rotor to said spring to rotate therewith when said spring is partially wound, holding means for latching the inner end of said spring to said frame when said spring is wound and means for instantaneously releasing said holding means to allow said spring to transfer its stored potential energy to kinetic energy of said rotor.

12. A gyroscope including a frame, a rotor shaft, coaxial bearing means supporting said shaft at its mid length, gimbal means supporting said bearing means on said frame, a pair of rotor inertia parts secured coaxially on said shaft at the respective opposite ends thereof, said shaft having a gyroscopically erect position, a clock type spring anchored at one end to said frame, means for releasably securing said other end of said spring to said rotor in the erect position of said shaft, means for winding the other end of said spring about said rotor shaft to store potential energy in said spring for spinning said rotor when required, means for latching said other end of said spring and said rotor against rotation and means for instantaneously unlatching said other end of said spring and said rotor to allow said spring to unwind while transferring the potential energy of said spring to the kinetic energy of said rotor while said rotor is maintained in an erect position and when the energy transfer is complete to release said rotor freely to spin about its axis.

References Cited in the file of this patent

UNITED STATES PATENTS

| | | |
|---|---|---|
| 2,731,836 | Wendt | Jan. 24, 1956 |
| 2,732,721 | Summers | Jan. 31, 1956 |
| 2,766,627 | Lower et al. | Oct. 16, 1956 |